United States Patent
Meng et al.

(10) Patent No.: US 11,501,411 B2
(45) Date of Patent: Nov. 15, 2022

(54) ANIMATION CONFIGURATION METHOD AND DISPLAY DEVICE

(71) Applicant: Hisense Visual Technology Co., Ltd., Qingdao (CN)

(72) Inventors: Yazhou Meng, Qingdao (CN); Chenglong Liu, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/343,290

(22) Filed: Jun. 9, 2021

(65) Prior Publication Data
US 2021/0295470 A1    Sep. 23, 2021

Related U.S. Application Data

(63) Continuation of application No. PCT/CN2020/080516, filed on Mar. 20, 2020.

(51) Int. Cl.
*G06T 3/60* (2006.01)
*G06T 13/00* (2011.01)

(52) U.S. Cl.
CPC ............. *G06T 3/60* (2013.01); *G06T 13/00* (2013.01)

(58) Field of Classification Search
None
See application file for complete search history.

(56) References Cited

U.S. PATENT DOCUMENTS

| | | | |
|---|---|---|---|
| 2018/0114351 A1* | 4/2018 | Rivard | G06F 3/0484 |
| 2019/0333479 A1 | 10/2019 | Maalouf et al. | |
| 2020/0301469 A1* | 9/2020 | Choi | G06T 3/60 |
| 2020/0301518 A1* | 9/2020 | Lee | F16M 11/18 |

FOREIGN PATENT DOCUMENTS

| | | |
|---|---|---|
| CN | 1385824 A | 12/2002 |
| CN | 104731311 A | 6/2015 |
| CN | 109027627 A | 12/2018 |
| CN | 110045753 A | 7/2019 |

* cited by examiner

*Primary Examiner* — Yi Wang
(74) *Attorney, Agent, or Firm* — Workman Nydegger (57) ABSTRACT

The disclosure provides an animation configuration method and a display device. The display device includes: a screen; a rotating component for driving the screen to rotate; and a controller. The controller is configured to receive a command for rotating the screen from a user, control the rotating component to drive the screen to rotate, monitor component rotation information of the rotating component, and configure a rotation animation based on the component rotation information.

14 Claims, 8 Drawing Sheets

ANIMATION CONFIGURATION METHOD AND DISPLAY DEVICE

CROSS-REFERENCE TO RELATED APPLICATIONS

This application is a continuation of International Application No. PCT/CN2020/080516 filed Mar. 20, 2020. The entire disclosure of the above application is incorporated herein by reference.

FIELD

The present disclosure relates to the smart television, and in particular to an animation configuration method and a display device.

BACKGROUND

This section provides background information related to the present disclosure which is not necessarily prior art.

Various applications such as social applications (traditional video applications and short video applications) and reading applications (comics and reading books) can be displayed on a screen of a smart TV, which provides rich media resources for the smart TV. Moreover, the smart TV may also exchange data and share resources with different terminals. For example, the smart TV may be connected with mobile devices (e.g., mobile phones) through wireless communication methods such as a local area network and Bluetooth, so as to play the resources in a mobile device or directly project screen and present pictures on the mobile device on the screen of a display device.

However, since different applications or media resources from different sources correspond to different aspect ratios, the smart television usually displays images different from a traditional video ratio. For example, video resources shot through terminals such as mobile phones are generally vertical media with aspect ratios of 9:16, 9:18 and 3:4, while pictures provided by reading applications belong to vertical resource with an aspect ratio similar to that of books. The aspect ratio of the display screen of the smart TV is generally in a landscape state of 16:9; and as a result, when displaying vertical media such as short videos and comics through the smart TV, the vertical media picture cannot be displayed normally because of mismatching of aspect ratio and display screen ratio. In most cases, the vertical media picture should be scaled for a complete display. However, presenting a vertical media picture on a display device in a landscape state or presenting a horizontal media picture on the display device in a portrait state can result in a poor user experience.

SUMMARY

This section provides a general summary of the disclosure, and is not a comprehensive disclosure of its full scope or all of its features.

Some embodiments of the disclosure provide a display device, which includes:
  a screen;
  a rotating component, connected to the screen and configured to drive the screen to rotate; and
  a controller, configured to:
  receive a command for rotating the screen from a user, control the rotating component to drive the screen to rotate;
  monitor component rotation information of the rotating component; and
  configure a rotation animation based on the component rotation information.

Some embodiments of the disclosure provide a display device, which includes:
  a screen;
  a rotating component, connected to the screen and configured to drive the screen to rotate; and
  a controller, configured to:
  receive a command for rotating the screen from a user, and present a non-centrosymmetric rotation animation on the screen; and
  control the rotating component to drive the screen to rotate in a first direction, and control the rotation animation to rotate in a second direction, where the first direction is related to the second direction.

Some embodiments of the disclosure provide a display device, which includes:
  a screen;
  a rotating component, connected to the screen and configured to drive the screen to rotate a target angle; and
  a controller, configured to:
  present a centrosymmetric rotation animation on the screen in response to a command for rotating the screen from a user; and
  control the rotating component to drive the screen to rotate.

Some embodiments of the disclosure provide a method for configuring a rotation animation, wherein the method is used for presenting a non-centrosymmetric rotation animation and includes:
  controlling a rotating component to drive a screen to rotate, in response to receiving a command for rotating the screen from a user;
  monitoring component rotation information of the rotating component; and
  configuring the rotation animation based on the component rotation information.

Some embodiments of the disclosure provide a method for configuring a rotation animation, which includes:
  presenting a centrosymmetric rotation animation on a screen, in response to receiving a command for rotating the screen from a user; and
  controlling a rotating component to drive the screen to rotate.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DETAILED DESCRIPTION

In order to cause those of ordinary skill in the art to better understand technical solutions of the disclosure, the technical solutions in embodiments of the disclosure will be clearly and fully described in combination with the accompanying drawings in the embodiments of the disclosure. Apparently, the described embodiments are merely part of, but not all, embodiments of the disclosure. Based on the embodiments of the disclosure, all other embodiments attainable by one of ordinary skill in the art without involving any inventive effort are within the scope of the disclosure.

A rotary television is a novel smart television, and mainly includes a display and a rotating component. The screen is fixed to a wall or a bracket through the rotating component, and a placing angle of the display is adjusted via the rotating component to rotate, so as to adapt to display images with different aspect ratios. For example, in most cases, the screen is placed transversely to display video images with an aspect ratio of 16:9 or 18:9. When the aspect ratio of video screen is 9:16 or 9:18, etc., the images need to be scaled on the transversely placed screen, and black regions are displayed on two sides of the screen. Therefore, the screen may be vertically placed via the rotating component to adapt to the video images with the aspect ratios of 9:16, 9:18, etc.

In order to facilitate users displaying target media resource detail pages under different rotating states of the screen and facilitate improving users' viewing experience under different viewing states of a display device, embodiments of the disclosure provide a display device, a display method of a detail page and a computer storage medium, where the display device is the rotary television, for example. It should be noted that the method of the embodiments is not only suitable for the rotary television, but also other display devices, such as a computer, a tablet computer, etc.

A term "module" used in the embodiments of the disclosure may refer to any known or later developed combination of hardware, software, firmware, artificial intelligence, fuzzy logics, or hardware or/and software codes, that can perform functions related to the element.

A term "remote controller" used in the embodiments of the disclosure refers to a component in an electronic device (e.g., the display device disclosed in the disclosure), and the component usually can wirelessly control the electronic device within a short distance range. The component generally may be connected with the electronic device via infrared rays and/or radio frequency (RF) signals and/or Bluetooth, and may also include WiFi, wireless USBs, Bluetooth, motion sensors and other functional modules. For example, a handheld touch remote controller replaces most physical built-in hard keys in a common remote control apparatus with a user interface in a touch screen.

The term "gesture", used in the embodiments of the disclosure, refers to user behaviors that are used for expressing expected ideas, motions, objectives or results through hand shape change or hand motions.

The term "hardware system", used in the embodiments of the disclosure, may refer to solid parts with computing, control, storage, input and output functions and constituted by mechanical, optical, electric and magnetic devices such as an integrated circuit (IC) and a printed circuit board (PCB). In embodiments of the disclosure, the hardware system is also commonly referred to as a motherboard or a main chip or a controller.

Figure 1A:
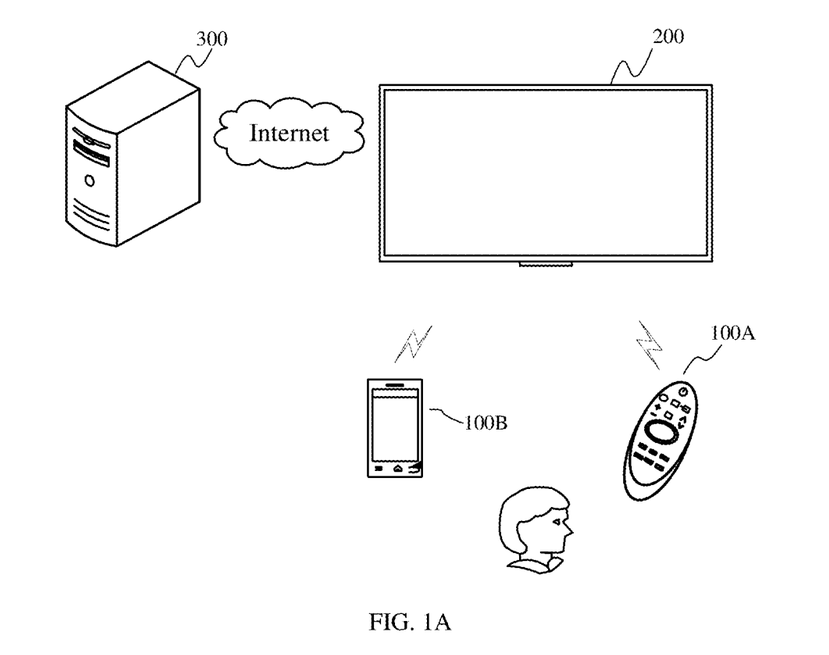
FIG. 1A illustrates an application scenario of a display device according to some embodiments of the disclosure.

FIG. 1A illustrates an application scenario of a display device provided by some embodiments of the disclosure. As shown in FIG. 1A, a control apparatus 100 can be kept in communication with a display device 200 in a wired or wireless manner.

The control apparatus 100 is configured to control the display device 200, and can receive an operation instruction input by a user and convert the operation instruction into an instruction that the display device 200 may identify and respond to, acting as an intermediary for interaction between the user and the display device 200. For example, the display device 200 responds to operation of channel up/down keys when the user operates channel up/down keys on the control apparatus 100.

The control apparatus 100 may be a remote controller 100A, adopts infrared protocol communication or Bluetooth protocol communication and other short range communication methods, and controls the display device 200 in a wireless or wired manner. The user can control the display device 200 by inputting a user instruction via keys on the remote controller, voice input or control panel input. For example, the user can input corresponding control instructions by using volume up/down keys, channel control keys, up/down/left/right movement keys, voice input keys, menu keys and on/off keys on the remote controller to achieve the function of controlling the display device 200.

The control apparatus 100 may also be a smart device such as a mobile terminal 100B, a tablet computer, a computer, a laptop computer, and the like. For example, an application running on the smart device is used for controlling the display device 200. The application may be configured to provide various controls for the user through an intuitive user interface (UI) on a screen associated with the smart device.

Exemplarily, the display device 200 may be installed with a software application through the mobile terminal 100B, so as to achieve connected communication via a network communication protocol and achieve the purpose of one-to-one control operation and data communication. For example, a control instruction protocol between the mobile terminal 100B and the display device 200 can be established to achieve the functions of physical keys arranged in the remote controller 100A, by operating various function keys or virtual controls of a user interface provided on the mobile terminal 100B. Audio and video contents displayed on the mobile terminal 100B may also be transmitted to the display device 200 to achieve a synchronized display function.

The display device 200 may provide a broadcast receiving function and a network television function supported by a computer. The display device may be implemented as, a digital television, a network television, an internet protocol television (IPTV), and the like.

The display device 200 may be a liquid crystal display, an organic light emitting display or a projection device. Specific display device types, dimensions, resolutions, etc. are not limited.

The display device 200 further implements data communication with a server 300 through a variety of communication modes. Specifically, the display device 200 may be allowed to perform communication connection through a local area network (LAN), a wireless local area network (WLAN), and other networks. The server 300 may provide a variety of contents for the display device 200 and support interactions therewith. Exemplarily, the display device 200 may transmit and receive messages, such as receiving electronic program guide (EPG) data, receiving software program updates, or accessing a digital media library stored remotely. The servers 300 may be one group, multiple groups, or one or more types of servers, and used for providing videos on demands, advertisement services and other network service contents.

Figure 1B:
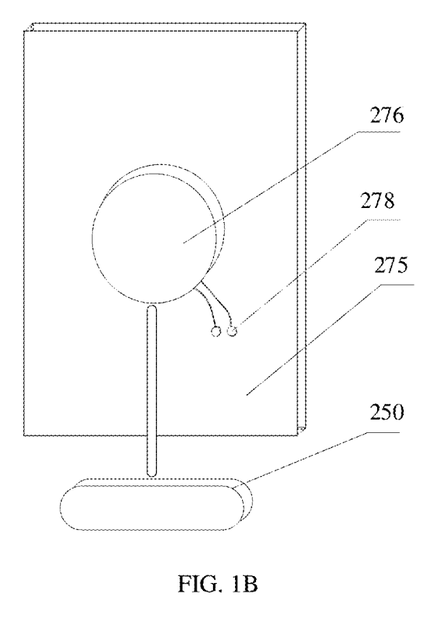
FIG. 1B illustrates a rear view of a display device according to some embodiments of the disclosure.

In some embodiments, as shown in FIG. 1B, the display device 200 includes a rotating component 276, a controller 250, a screen 275, a terminal interface 278 extending from a gap in a back panel, and a rotating component 276 connected to the back panel. The rotating component 276 may enable the display screen to rotate, and may rotate a display screen to a portrait state when viewed from the front of the display device, i.e., a state where a vertical side of the screen is longer than a horizontal side, or to a landscape state, i.e., a state where the horizontal side of the screen is longer than the vertical side.

Figure 2:
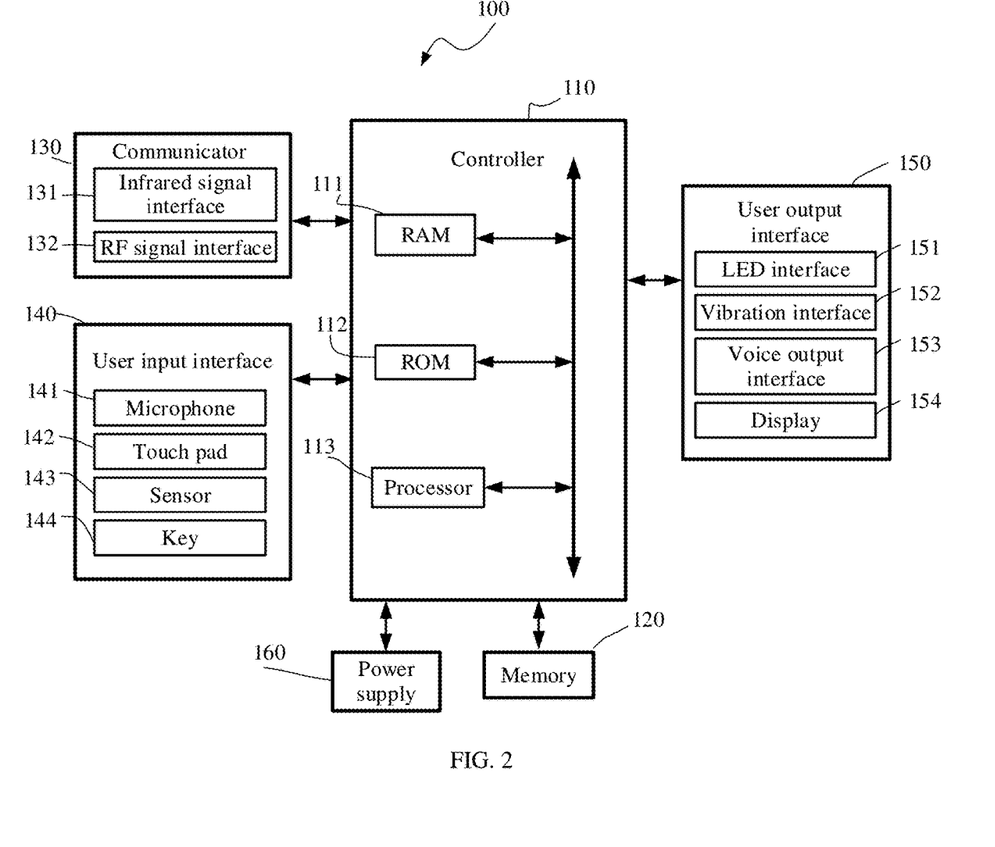
FIG. 2 illustrates a block diagram showing hardware configuration of a control apparatus 100 in FIG. 1 according to some embodiments of the disclosure.

FIG. 2 exemplarily illustrates a configuration block diagram of the control apparatus 100. As shown in FIG. 2, the control apparatus 100 includes a controller 110, a memory 120, a communicator 130, a user input interface 140, a user output interface 150, and a power supply 160.

The controller 110 includes a random access memory (RAM) 111, a read-only memory (ROM) 112, a processor 113, a communication interface, and a communication bus. The controller 110 is used for controlling running and operation of the control apparatus 100, communication collaboration between internal parts, and external and internal data processing functions.

Exemplarily, when an interaction that a user presses a key arranged on a remote controller 100A or an interaction that the user touches a touch panel arranged on the remote controller 100A is detected, the controller 110 may control to generate signals corresponding to the detected interactions, and transmit the signal to the display device 200.

The memory 120 is configured to store various operating programs, data, and applications for driving and controlling the control apparatus 100 under the control of the controller 110. The memory 120 can store various types of control signal instructions input by the user.

The communicator 130 achieves the communication of control signals and data signals with the display device 200 under the control of the controller 110. For example, the control apparatus 100 transmits the control signal (e.g., a touch signal or a control signal) to the display device 200 via the communicator 130, and receives signals transmitted by the display device 200 via the communicator 130. The communicator 130 may include an infrared signal interface 131 and an RF signal interface 132. For example, when the infrared signal interface is used, the user input instruction should be converted into an infrared control signal in accordance with an infrared control protocol and transmitted to the display device 200 via an infrared transmitting module. For another example, when the RF signal interface is used, the user input instruction should be converted into a digital signal, modulated in accordance with a RF control signal modulation protocol, and then transmitted to the display device 200 through a RF transmitting terminal.

The user input interface 140 may include at least one of a microphone 141, a touch pad 142, a sensor 143 and a key 144, so that the user can input a user instruction regarding control of the display device 200 to the control apparatus 100 by voice, touch, gesture, press, and the like.

The user output interface 150 is configured to output the user instructions received by the user input interface 140 to the display device 200, or output images or voice signals received by the display device 200. The user output interface 150 may include a light-emitting diode (LED) interface 151, a vibration interface 152 for generating vibrations, an audio output interface 153 for outputting sounds, and a display 154 for outputting images. For example, the remote controller 100A may receive output signals such as audio, video, or data from the user output interface 150, and display the output signals on the display 154 in an image form, output the output signals on the audio output interface 153 in an audio form, or output the output signals on the vibration interface 152 in a vibration form.

The power supply 160 is configured to provide operational power for various elements of the control apparatus 100 under the control of the controller 110, and may be in the form of batteries and related control circuits.

Figure 3:
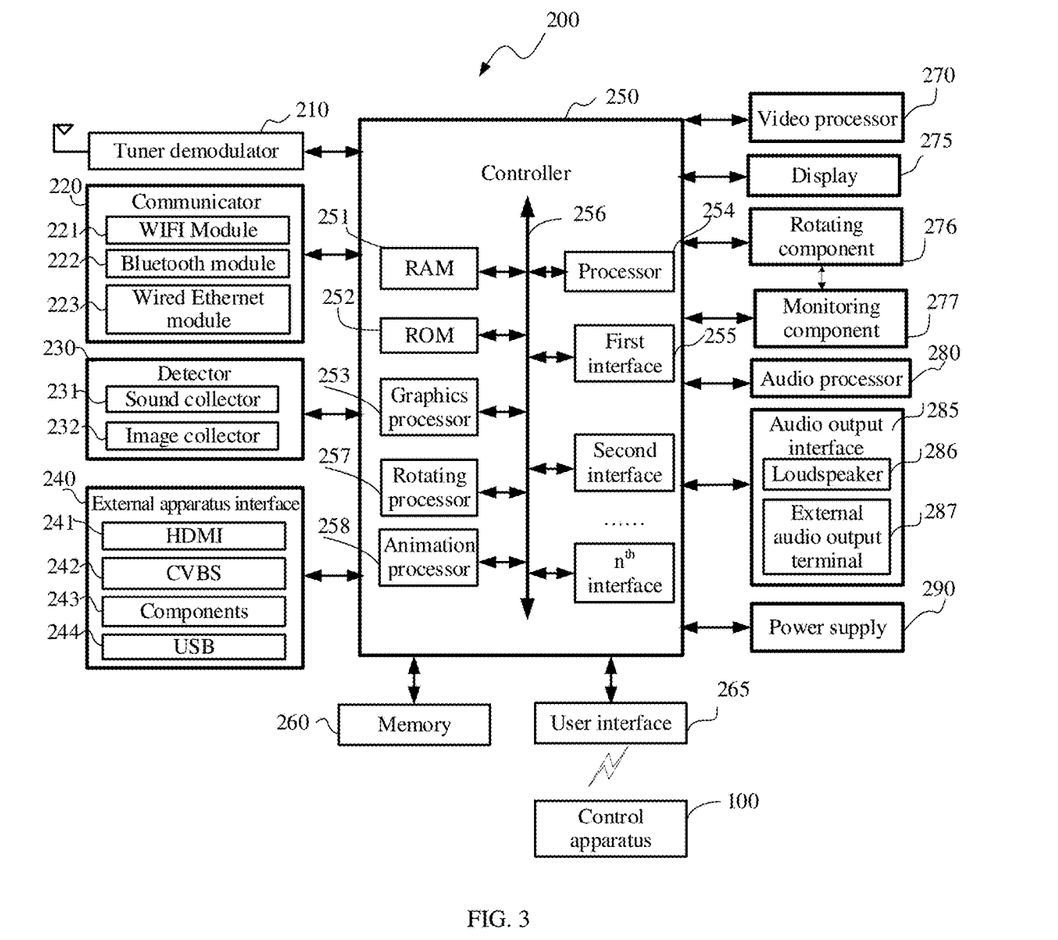
FIG. 3 illustrates a block diagram showing hardware configuration of a display device 200 in FIG. 1 according to some embodiments of the disclosure.

FIG. 3 exemplarily illustrates a block diagram of hardware configuration of a display device 200. As shown in FIG. 3, the display device 200 can include a tuner demodulator 210, a communicator 220, a detector 230, an external apparatus interface 240, a controller 250, a memory 260, a user interface 265, a video processor 270, a screen 275, a rotating component 276, a monitoring component 277, an audio processor 280, an audio output interface 285, and a power supply 290.

The monitoring component 277 may be set independently or in the controller.

The rotating component 276 may include a drive motor, a rotating shaft and other parts. The drive motor may be connected to the controller 250 and output a rotation angle under the control of the controller 250. One end of the rotating shaft is connected to the power output shaft of the drive motor and the other end of the rotating shaft is connected to the screen 275, so that the screen 275 can be fixedly mounted on a wall or a bracket by the rotating component 276.

The rotating component 276 may further include other parts such as a transmission part, a detection part, and the like. The transmission part may adjust a rotational speed and torque output by the rotating component 276 at a specific transmission ratio, and may be a gear transmission mode. The detection part may be composed of sensors arranged on the rotating shaft, such as an angle sensor, an attitude sensor, and the like. These sensors may detect parameters such as a rotation angle of the rotating component 276 and transmit the detected parameters to the controller 250, so that the controller 250 can judge or adjust a state of the display device 200 based on the detected parameters. In practice applications, the rotating component 276 may include, but is not limited to, one or more of the above parts.

The monitoring component 277 is used for monitoring the rotation information of the rotating component 276 and outputting the rotation information to the controller.

The tuner demodulator 210 receives radio and television signals in a wired or wireless manner, implements modulation and demodulation processes such as amplification, mixing, and resonance, and is used for demodulating audio and video signals carried in a frequency of a television channel selected by the user and additional information (such as EPG data) from a plurality of wireless or wired radio and television signals.

The tuner demodulator 210 may be controlled by the controller 250 to respond to the frequency of the television channel selected by the user and a television signal carried by the frequency according to the user's selection.

The tuner demodulator 210 may receive signals in a variety of ways such as terrestrial broadcasting, cable broadcasting, satellite broadcasting or Internet broadcasting according to different broadcast systems of television signals; may adopt a digital modulation manner or an analog modulation manner according to different modulating types; and may demodulate an analog signal or a digital signal according to different types of received television signals.

In some other exemplary embodiments, the tuner demodulator 210 may also be arranged in an external device, for example, an external set-top box. In this way, the set-top box outputs television signals after modulation and demodulation, and inputs the signals to the display device 200 via the external apparatus interface 240.

The communicator 220 is a component for communicating with external devices or external servers according to various communication protocol types. For example, the display device 200 may transmit content data to an external device connected with the communicator 220, or, browse and download the content data via the external device connected with the communicator 220. The communicator 220 may include a network communication protocol module or a near-field communication protocol module such as a WIFI module 221, a Bluetooth communication protocol module 222 and a wired Ethernet communication protocol module 223, so that the communicator 220 may receive control signals from the control apparatus 100 under the control of the controller 250 and implement the control signals as WIFI signals, Bluetooth signals, RF signals, and the like.

The detector 230 is a component of the display device 200 for capturing signals from an external environment or signals interacted with the outside. The detector 230 may include a sound collector 231 (e.g. a microphone) that may be used for receiving the user's voice such as voice signals of the user for controlling control instructions of the display device 200, or can collect environment sounds which are used for identifying environment scenario types, so as to make the display device 200 self-adaptive to environment noise.

In some other exemplary embodiments, the detector 230 may also include an image collector 232 (e.g. a camera) for capturing external environmental scenes, so as to adapt to the change of display parameters of the display device 200, and for capturing user attributes or interacting gestures with the user to achieve an interaction between the display device and the user.

In some other exemplary embodiments, the detector 230 may also include a light receiver for capturing environment light intensity, so as to be self-adaptive to the change of the display parameters of the display device 200.

In some other exemplary embodiments, the detector 230 may also include a temperature sensor for sensing an environment temperature so that the display device 200 may self-adaptively adjust a display color temperature of an image. Exemplarily, the display device 200 may be adjusted to display an image color temperature in a cooler tone at a high environmental temperature or in a warmer tone at a low environmental temperature.

The external apparatus interface 240 is a component that provides data transmission between the display device 200 and external devices controlled by the controller 250. The external apparatus interface 240 may be connected to external devices such as set-top boxes, gaming devices, laptops in a wired/wireless manner, and may receive data such as video signals (e.g., motion images), audio signals (e.g., music) and additional information (e.g., EPG) from the external devices.

The external apparatus interface 240 may include any one or more of a high-definition multimedia interface (HDMI) terminal 241, a composite video blanking synchronization (CVBS) terminal 242, an analog or digital component terminal 243, a USB terminal 244, a component terminal (not shown), a red, green and blue (RGB) terminal (not shown), and the like.

The controller 250 controls the operation of the display device 200 and responds to the operation of the user by running various software control programs (e.g. an operating system and various applications) stored in the memory 260.

As shown in FIG. 3, the controller 250 includes a RAM 251, a ROM 252, a graphics processor 253, a central processing unit (CPU) processor 254, a communication interface 255, a communication bus 256, a rotating processor 257, and an animation processor 258. Herein, the RAM 251, the ROM 252, the graphics processor 253, the CPU processor 254, the communication interface 255, the rotating processor 257, and the animation processor 258 are connected via the communication bus 256. The functions of the rotating processor 257 and the animation processor 258 will be described in detail in subsequent embodiments.

The ROM 252 is configured to store various system startup instructions. For example, when receiving a start signal, the power supply of the display device 200 begins to be started, and the CPU processor 254 runs a system startup instruction in the ROM 252 and copies an operating system stored in the memory 260 into the RAM 251 to start running the operating system. When the operating system is started, the CPU processor 254 copies the various applications in the memory 260 to the RAM 251 and then starts running the various applications.

The graphics processor 253 is configured to generate various graphics objects such as icons, manipulation menus, user input instructions to display graphics, and the like. The graphics processor 253 may include an arithmetic unit for performing operations by receiving various interactive instructions input by a user, thereby displaying various objects based on display properties; and a renderer for generating various objects obtained by the arithmetic unit and displaying rendered results on the screen 275.

The CPU processor 254 is configured to execute the operating system and application instructions stored in the memory 260 and execute processing of various applications, data, and contents based on the received user input instructions, so as to finally display and play various audio and video contents.

In some exemplary embodiments, the CPU processor 254 may include multiple processors. The multiple processors may include a main processor and multiple or one subprocessor. The main processor is configured to execute some initialization operations of the display device 200 in a pre-loading mode of the display device, and/or, display images in a normal mode. The multiple or one sub-processor is configured to execute operations in a display device standby mode, and the like.

The communication interface 255 may include a first interface to an $n^{th}$ interface. These interfaces can be network interfaces connected to an external device via a network.

The controller 250 may control the overall operation of the display device 200. For example: in response to receiving a user input instruction for selecting a graphical user interface (GUI) object to be displayed on the screen 275, the controller 250 may then execute an operation related to the object selected by the user input instruction.

The object may be any one of selectable objects, such as a hyperlink or an icon. The operation related to the selected object may be an operation to display and connect to a hyperlinked page, a document and an image, or an operation to execute a program corresponding to the object. The user input instruction for selecting the GUI object may be an instruction input by various input apparatuses (e.g., a mouse, a keyboard and a touch pad, etc.) connected to the display device 200 or a voice instruction corresponding to a voice spoken by the user.

The memory 260 is configured to store various types of data, software programs or applications that drive and control the operation of the display device 200. The memory 260 may be a volatile and/or a non-volatile memory. The term "memory" includes the memory 260, the RAM 251 and the ROM 252 of the controller 250, or a memory card in the display device 200.

In some embodiments, the memory 260 is specifically configured to store a running program that drives the controller 250 of the display device 200, store various applications built into the display device 200 and downloaded by the user from external devices, and store data such as visual effect images for configuring various GUIs provided by the screen 275, various objects related to the GUIs, and selectors for selecting GUI objects.

In some embodiments, the memory 260 is specifically configured to store driving programs and related data of the tuner demodulator 210, the communicator 220, the detector 230, the external apparatus interface 240, the video processor 270, the screen 275 and the audio processor 280, e.g. external data received from the external apparatus interface (e.g., audio and video data) or user data received from the user interface (e.g., key information, voice information and touch information).

In some embodiments, the memory 260 specifically stores software and/or programs for representing an operating system (OS), and the software and/or programs may include, for example, a kernel, middleware, an application programming interface (API) and/or an application. Exemplarily, the kernel may control or manage system resources and functions implemented by other programs (such as the middleware, the API or the application); meanwhile, the kernel may provide an interface to allow the middleware, the API or the application to access the controller, to achieve control or management of the system resources.

Figure 4:
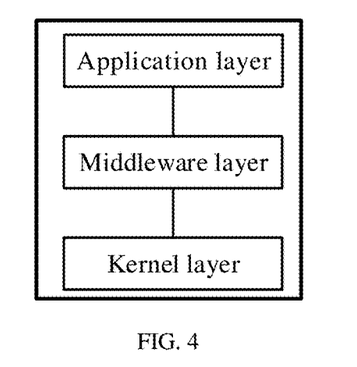
FIG. 4 illustrates a block diagram showing architectural configuration of an operating system in a memory of a display device 200 according to some embodiments of the disclosure.

FIG. 4 exemplarily illustrates an architecture configuration block diagram of the operating system in the memory of the display device 200. Architecture of the operating system includes an application layer, a middleware layer and a kernel layer from top to bottom.

Built-in applications and non-system level applications both belong to the application layer. The application layer is responsible for direct interaction with the user, and may include multiple applications such as a setting application, an electronic post application and a media center application. These applications are mainly developed based on the Android system, with the development language of Java/C++. These applications may also be implemented as Web applications, which are executed based on WebKit engine and may be specifically developed and executed based on hypertext markup language 5 (HTML5), cascading style sheets (CSS) and JavaScript.

Specifically, HTML (HyperText Markup Language) is a standard markup language for creating web pages, and describes web pages through markup tags; and HTML tags are used for explaining texts, graphics, animations, sounds, tables and links. Then a browses will read HTML documents, explain the contents of tags in the documents, and display them as a web page.

The CSS, with the full name of Cascading Style Sheet, is a computer language used for expressing a style of HTML files, and may define a style structure such as font, color and location. CSS styles may be directly stored in HTML web pages or separate style files to control the styles in the web pages.

JavaScript, a language applied to Web page programming, may be inserted into HTML pages, and interpreted and executed by browsers. The interactive logic of Web applications is implemented by JavaScript. JavaScript may encapsulate JavaScript extension interface through a browser to implement communication with the kernel layer.

The middleware layer may provide some standardized interfaces to support various operations in various environments and systems. For example, the middleware layer may be implemented as a multimedia and hypermedia information coding expert group (MHEG) of middleware related to data broadcasting, may also be implemented as a digital living network alliance (DLNA) middleware of the middleware related to communication with external devices, and may also be implemented as middleware for providing a browser environment in which various applications in the display device run.

The kernel layer provides core system services such as file management, memory management, process management, network management and system security authority management. The kernel layer may be implemented as a kernel based on various operating systems, for example, a kernel based on the Linux operating system.

The kernel layer also provides communication between system software and hardware, and provides device driver services for various hardware, e.g., a display driver provided for the screen 275, a camera driver provided for the camera, a key driver provided for the remote controller, a WiFi driver provided for a WIFI module, an audio driver provided for the audio output interface, and a power management driver provided for a power management (PM) module.

In FIG. 3, the user interface 265 receives various user interactions. Specifically, the user interface is configured to transmit a user input signal to the controller 250, or transmit an output signal from the controller 250 to the user. Exemplarily, the remote controller 100A may transmit a signal input by a user such as a power switch signal, a channel selection signal and a volume control signal to the user interface 265, and then the user interface 265 transmits them to the controller 250. Alternatively, the remote controller 100A may receive output signals such as audio, video or data processed by the controller 250 and output from the user interface 265, and display the received output signals or output the received output signals in an audio or vibration form.

In some embodiments, a user may input a user instruction on a GUI displayed on the screen 275, and then the user interface 265 receives the user input instruction through the GUI. Exactly, the user interface 265 may receive a user input instruction for controlling the position of a selector in the GUI to select different objects or items. The "user interface" is a medium interface for interaction and information exchange between applications or operating systems and the user, and implements the conversion between an internal form of information and a form acceptable to the user. The GUI, a common form of a user interface, refers to a user interface related to computer operation displayed in a graphical way. The GUI may be an icon, a window, a control and other interface elements displayed on a display screen of an electronic device; where the control may include visual interface elements such as icons, controls, menus, tabs, text boxes, dialog boxes, status bars, channel bars and Widget.

Alternatively, the user may input a user instruction by inputting a specific sound or gesture, and the user interface 265 identifies the sound or gesture through a sensor to receive the user input instruction.

The video processor 270 is configured to receive external video signals, and perform video data processing such as decompression, decoding, scaling, noise reduction, frame rate conversion, resolution conversion and image synthesis according to a standard encoding and decoding protocol of input signals, so as to obtain video signals directly displayed or played on the screen 275.

Exemplarily, the video processor 270 includes a demultiplexing module, a video decoding module, an image synthesis module, a frame rate conversion module and a display formatting module.

The demultiplexing module is configured to perform demultiplexing input audio and video data streams; for example, when a moving pictures experts group 2 (MPEG-2) stream (based on a compression standard for digitally stored media motion images and voice) is input, the demultiplexing module performs demultiplexing the MPEG-2 stream into video signals and audio signals.

The video decoding module is configured to process the video signals after demultiplexing, including decoding and scaling processing.

The image synthesis module, such as an image synthesizer, is configured to perform superposing and mixing processing on a graph builder and scaled video images according to GUI signals which are input by the user or self-generated, so as to generate image signals that can be displayed.

The frame rate conversion module is configured to convert a frame rate of an input video, for example, a frame rate of an input video with 60 Hz is converted into a frame rate of 120 Hz or 240 Hz, and a common format is realized by a frame inserting way.

The display formatting module is configured to change signals output by the frame rate conversion module into signals which accord with, for example, a display format of the screen 275. For instance, the signals output by the frame rate conversion module are subjected to format conversion to output RGB data signals.

The screen 275 is configured to receive an image signal input from the video processor 270, and display video content, image and menu interface. The displayed video content may be the video content in a broadcast signal received by the tuner demodulator 210, or the video content input by the communicator 220 or the external apparatus interface 240. The screen 275 also displays a user control interface (UI) generated in the display device 200 and used for controlling the display device 200.

As well, the screen 275 may include a display component for presenting pictures and a driving component for driving image display. Alternatively, if the screen 275 is a projection screen 275, it may also include a projection device and a projection screen.

The rotating component 276 may be a rotator such as a device including a motor that drives the display to rotate. The controller may transmit a control signal, indicating the rotating component 276 to rotate the screen 275.

The monitoring component 277 is configured to monitor the component rotation information of the rotating component 276 and output the component rotation information to the controller.

The audio processor 280 is configured to receive an external audio signal, and perform audio data processing such as decompression, decoding, noise reduction, digital-analog conversion and amplification according to standard encoding and decoding protocols of input signals, so as to obtain audio signals that can be played in a loudspeaker 286.

Exemplarily, the audio processor 280 may support various audio formats, e.g., MPEG-2, MPEG-4, advanced audio coding (AAC) and high efficiency AAC (HE-AAC).

The audio output interface 285 is configured to receive the audio signal output by the audio processor 280 under the control of the controller 250, and may include the loudspeaker 286 or an external audio output terminal 287, such as an earphone output terminal, that is output to a generator of an external device.

In some other exemplary embodiments, the video processor 270 may include one or more chips, and the audio processor 280 may also include one or more chips.

As well, in some other exemplary embodiments, the video processor 270 and the audio processor 280 may be separate chips, or may be integrated with the controller 250 in one or more chips.

The power supply 290 is configured to provide power supply support for the display device 200 through power input from an external power supply under the control of the controller 250. The power supply 290 may be a built-in power circuit installed in the display device 200, and may also be a power supply installed to the outside of the display device 200.

To improve the user experience, the rotation animation is usually played during the rotation of the above-mentioned display device. However, due to the large volume, the rotating speed is low and may take up to 8-10 seconds to complete a rotation process. The rotation animation is tilted while the device is rotating, which affect the user experience.

In view of the above issues, the embodiments of the disclosure provide a display device, wherein the structures and configurations of the functional modules may refer to the above embodiments. Functions of the controller 250 will be further described below.

Figure 5:
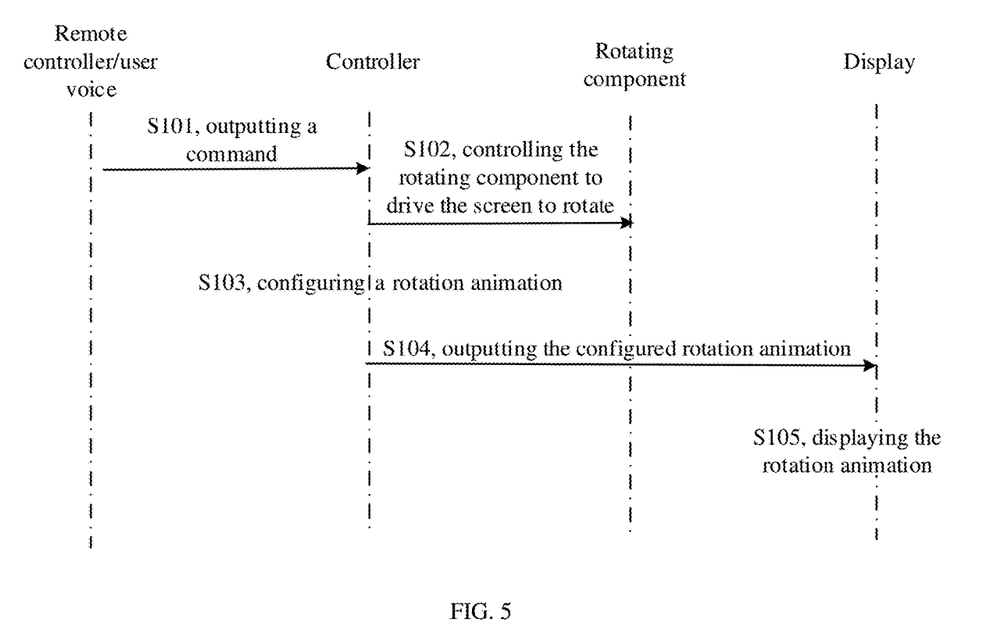
FIG. 5 illustrates an operation flow chart of a display device according to an embodiment of the disclosure.

Please refer to FIG. 5 for an operation process of the display device. The operation flow chart of FIG. 5 may be used for the display device which allows to rotate the animation as an axial symmetric picture.

The controller 250 is configured to: in response to a command for rotating a screen of the display device input from a user, create a rotation animation, and control the rotating component to drive the screen to rotate.

In some embodiments of the disclosure, the rotation animation is a centrosymmetric picture. The rotation animation rotates with the screen 275 during the rotation of the screen 275. However, since the rotation animation is a centrosymmetric picture, the rotation animation does not affect the user's vision during the rotation. Therefore, in the embodiments, a start instruction is directly transmitted to the controller 250 after the controller 250 receives a rotation instruction containing first rotation information. Upon receiving the start instruction, the controller 250 configures the rotation animation.

In an embodiment, a rotation animation of a display device is a hollow sphere. In an initial state, a display 275 of the display device is in a landscape state. When a user intends to watch vertical media through the display device such as short videos, photos, or videos generated by taking photos via the display device, an operation process of the display device can be referred to FIG. 5.

S101, A controller 250 receives a command from a user. The command may be a user voice, for example, "rotate left 90 degrees". In the embodiments, the command may also be an operation instruction. Specifically, the user may issue an operation instruction to the controller 250 through the remote controller; for example, when a volume down button of the remote controller is assigned to a function such as a first rotation information "rotate left 90 degrees", the user may press the volume down button to trigger the remote controller to transmit the rotation command "rotate left 90 degrees" to the controller 250.

S102, the controller 250 causes the rotating component to drive the screen to rotate upon receiving the command.

For example, when the user command is "rotate left 90 degrees", the corresponding first rotation information will be "rotate left 90 degrees".

S103, the controller 250 configures the rotation animation upon receiving the command.

S104, the controller 250 outputs the configured rotation animation.

S105, the screen 275 displays the rotation animation output by the controller 250.

Figure 6A:
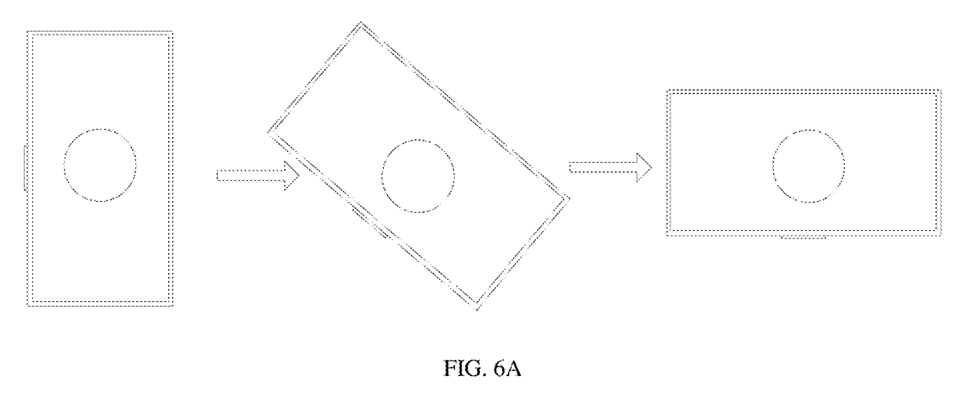
FIG. 6A illustrates a schematic diagram of a display interface during rotation of a display according to an embodiment of the disclosure.
Figure 6B:
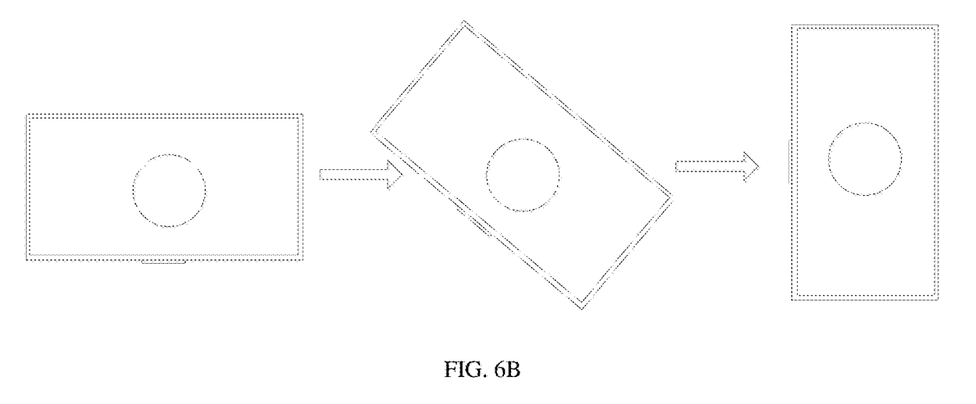
FIG. 6B illustrates a schematic diagram of a display interface during rotation of a display according to an embodiment of the disclosure.

In the embodiments, FIG. 6A and FIG. 6B show schematic diagrams of the display interfaces during rotation of the screen 275. It can be seen that the rotation animation does not affect the user view during rotation of the screen, since the rotation animation is a centrosymmetric picture.

In another embodiment, a display device is illustrated, and a rotation animation configured by the display device is a non-centrosymmetric picture. A structure of the display device and functions of various parts can refer to the above embodiments. A controller 250 and functions of the controller 250 will be further described in below.

Figure 7A:
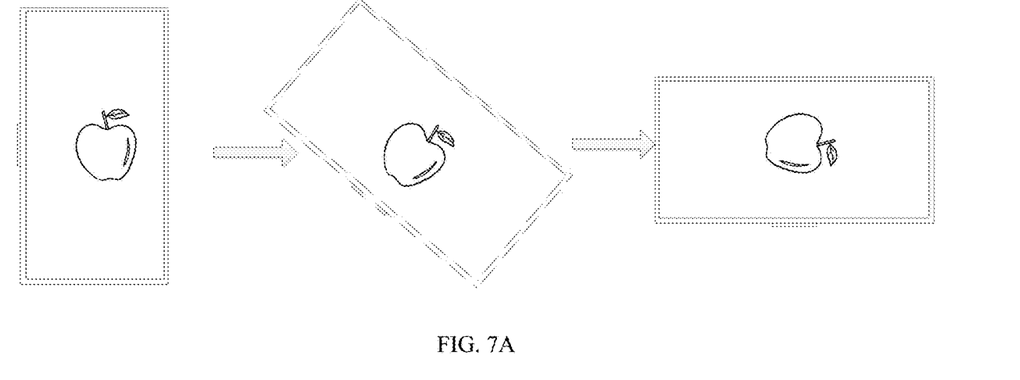
FIG. 7A illustrates a schematic diagram of a display interface during rotation.
Figure 7B:
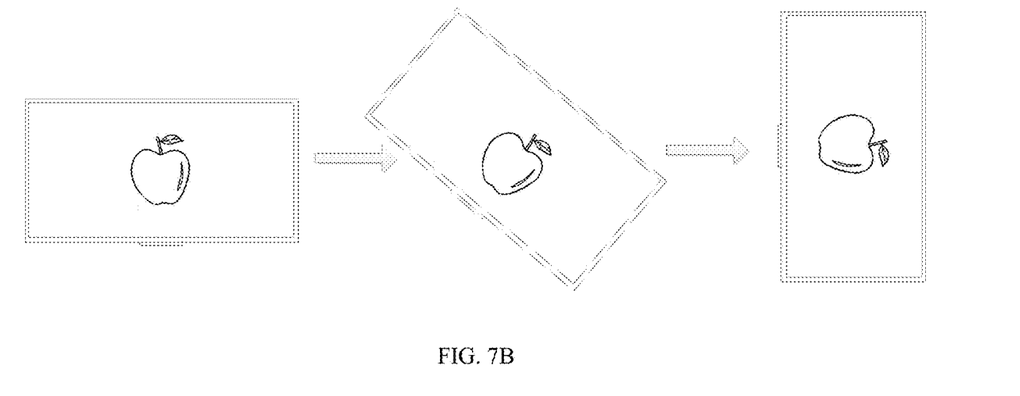
FIG. 7B illustrates a schematic diagram of a display interface during rotation.

The rotation animation of the non-centrosymmetric picture rotates with a screen 275 during the rotation of the screen 275. FIG. 7A and FIG. 7B exemplarily illustrate display interfaces of the screen 275 during the rotation. It can be seen that the rotation animation in the figures is an apple, and the rotation animation also rotates during the rotation of the screen 275, causing the rotation animation for view to be tilted.

Figure 8:
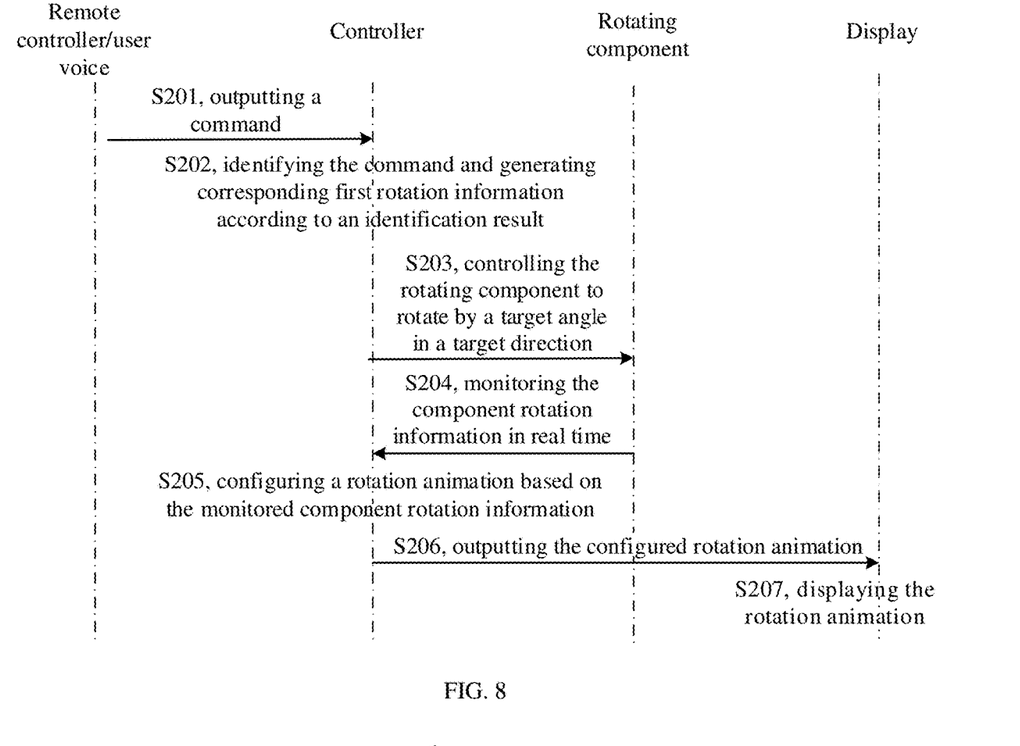
FIG. 8 illustrates an operation flow chart of a display device according to an embodiment of the disclosure.

In view of the above issues, the display device is illustrated in the embodiments, and the operation process of the display device can refer to FIG. 8. An operation flow chart of FIG. 8 can be used for the display device configured to rotate the animation as a non-centrosymmetric picture.

A workflow of the display device includes the following steps.

S201, the controller 250 receives a command issued from a user.

In the embodiments, the command may be a voice command, for example, the user voice is "rotate X 'XX' degrees". In the embodiments, the command may also be an operation instruction. Specifically, the user may issue an operation instruction to the controller 250 through the remote controller; for example, when a volume down button of the remote controller is configured to indicate a first rotation information "rotate X 'XX' degrees", the user may press the volume down button to trigger the remote controller to output the operation instruction.

In a scenario where the user interacts with the controller 250 through voice, the command is a user's voice command. Accordingly, the controller 250 is configured to execute step S202: the command is identified and the corresponding first rotation information is generated according to an identification result, where the first rotation information includes a target direction and a target angle.

In an exemplary embodiment, the controller may control a rotating component to drive the screen to rotate in a first direction (also called a component rotation direction hereafter), and control the rotation animation to rotate in a second direction (also called an animation rotation direction hereafter), where the first direction and the second direction are related; for example, the first direction may be opposite to the second direction, and the component rotation direction and animation rotation direction will be described in detail later.

S203, the rotating component is controlled to rotate by the target angle along the target direction.

Specifically, the controller 250 is further configured to identify a direction and an angle $\theta\_i$ based on the user's voice data. In response to the angle being less than or equal to 180 degrees, the direction and $\theta\_i$ are determined as a first rotation information. In response to the angle being greater than 180 degrees, a reverse direction of the direction and $360-\theta\_i$ are determined as the first rotation information.

The process of generating the first rotation information will now be described in detail with reference to specific examples.

In an embodiment, the user voice command is "rotate left 30 degrees". Upon receiving the command "rotate left 30 degrees", the controller 250 identifies in the command, the direction "rotate left" and the angle $\theta\_i$ "30 degrees". The first rotation information is determined as "rotate left 30 degrees".

In an embodiment, the user voice data is "rotate left 270 degrees". Upon receiving the command "rotate left 270 degrees", the controller 250 identifies, in the control instruction, the direction "rotate left" and the angle $\theta\_i$ as "270 degrees". The controller 250 determines that "270 degrees" is greater than "180 degrees". In this case, "360−270=90 degrees" and "'rotate right' as reverse information of 'rotate left'" are determined as the first rotation information, and the first rotation information is "rotate right 90 degrees".

Using the determination approach of the first rotation information illustrated in the embodiments of the disclosure, the screen 275 can be rotated by an angle as the user expects in the shortest possible time, thus shortening the waiting time of the user and correspondingly improving user's experience. In the above embodiments, if the user generates the first rotation information directly according to the user voice data, the corresponding first rotation instruction is "rotate left 270 degrees". When the controller 250 transmits the rotation command "rotate left 270 degrees" to the rotating component 276, the rotating component 276 will rotate the screen 275 by 270 degrees based on the command. Using the determination approach of the first rotation information illustrated above, the first rotation instruction is "rotate right 90 degrees". When the controller 250 transmits the rotation command "rotate right 90 degrees" to the rotating component 276, the rotating component 276 will rotate the screen 275 by 90 degrees based on the command. The final results achieved by the two control methods are the same. Obviously, based on the approach for determining the first rotation information in the disclosure, the screen 275 can be rotated by the angle as the user's expectation in the shortest time, which shortens the waiting time of the user and correspondingly improves user's experience.

It is noted that the above process of determining the first rotation information may be completed in the controller 250 or the rotating processor 257 configured in the controller 250. In some embodiments, the determination of the first rotation information may also be completed in the rotating processor 257 in the display device independently.

In another embodiment, the user transmits a command to the controller 250 through a remote controller. The remote controller is configured to transmit corresponding operation commands based on touch control of the user, and the controller 250 is further configured to identify the first rotation information corresponding to the operation command.

Figure 9:
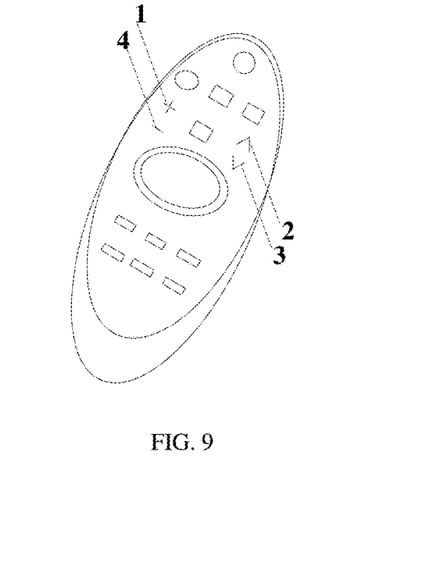
FIG. 9 illustrates a schematic diagram of a remote controller according to an embodiment of the disclosure.

Specifically, the remote controller usually has a plurality of keys such as volume control keys, channel switch keys and signal source keys. The correspondence between each key and the rotation information may be set in advance. When the user presses a key, the remote controller will transmit an operation command containing the rotation information allocated to the key to the controller 250.

FIG. 9 is a schematic diagram of a remote controller according to an exemplary embodiment, where key 1 is a key corresponding to "volume up", key 2 is a key corresponding to "channel up", key 3 is a key corresponding to "channel down", and key 4 is a key corresponding to "volume down". Specifically, in a scenario of controlling the rotation of the screen 275 in the embodiments, the key 1, the key 2, the key 3 and the key 4 are all keys of the remote controller for rotating. Specifically, as shown in the figure, the key 1 is used for controlling the screen 275 to rotate 360 degrees, the key 2 is used for controlling the screen 275 to rotate left 90 degrees, the key 3 is used for controlling the screen 275 to rotate left 180 degrees, and the key 4 is used for controlling the screen 275 to rotate right 90 degrees. It is noted that the embodiments are only for illustrating the correspondence between rotation functions and the keys. In other embodiments, the correspondence between the keys and the rotation functions can be configured according to the user's preference.

The user presses the key 2 during the interaction process between the remote controller shown in FIG. 9 and the controller 250. The remote controller is triggered by the user operation to transmit a command "rotate left 90 degrees" to the controller 250. The controller 250 identifies that the first rotation information corresponding to the command "rotate left 90 degrees", and transmits a rotation instruction of "rotate left 90 degrees" to the rotating component 276. Then the rotating component 276 drives the screen 275 to rotate left 90 degrees based on rotating instruction.

S204, the controller 250 monitors the component rotation information in real time.

In the embodiments, the controller 250 detects the component rotation information in real time, and the component rotation information at least includes a component rotation angle and a component rotation direction.

In an embodiment, the controller 250 may transmit the detected component rotation information to the controller 250 at preset intervals.

It is noted that the process of collecting a component rotation angle may be completed in the controller 250 or the monitor component 277 configured in the controller 250. In some embodiments, the process of collecting a component rotation angle may also be completed in the monitor component in the display device independently.

A data collection process of the controller 250 will now be described in detail with reference to specific examples.

In an embodiment, the controller 250 collects an increment value of the component rotation angle every 0.2 s. The data collected by the controller 250 can refer to Table 1.

TABLE 1

| Duration (S) | Collection result (degree) |
|---|---|
| 0.2 | 2 |
| 0.4 | 2 |
| 0.8 | 2 |
| 1 | 2 |
| 1.2 | 2 |
| 1.4 | 2 |
| 1.6 | 2 |
| 1.8 | 2 |
| 2.0 | 2 |
| 2.2 | 2 |
| 2.4 | 2 |
| 2.6 | 2 |
| 2.8 | 2 |
| 3.0 | 2 |
| 3.2 | 2 |
| 3.4 | 2 |
| 3.8 | 2 |
| 4.0 | 2 |
| 4.2 | 2 |
| 4.4 | 2 |
| 4.6 | 2 |
| 4.8 | 2 |
| 5.0 | 2 |
| 5.2 | 2 |
| 5.4 | 2 |
| 5.6 | 2 |
| 5.8 | 2 |
| 6.0 | 2 |
| 6.2 | 2 |
| 6.4 | 2 |
| 6.8 | 2 |
| 7.0 | 2 |
| 7.2 | 2 |
| 7.4 | 2 |
| 7.6 | 2 |
| 7.8 | 2 |
| 8.0 | 2 |
| 8.2 | 2 |
| 8.4 | 2 |
| 8.6 | 2 |
| 8.8 | 2 |
| 9.0 | 2 |
| 9.2 | 0 |
| 9.4 | 0 |
| 9.8 | 0 |
| 10.0 | 0 |
| 10.2 | 0 |
| 10.4 | 0 |
| 10.6 | 0 |
| 10.8 | 0 |
| 11.0 | 0 |
| 11.2 | 0 |
| 11.4 | 0 |

TABLE 1-continued

| Duration (S) | Collection result (degree) |
|---|---|
| 11.6 | 0 |
| 11.8 | 0 |
| 12.0 | 0 |

In the embodiments, the data collected by the controller 250 is angle increment values, and each angle increment value corresponds to a component rotation angle.

In practical scenario, the screen 275 may rotate due to human actions. Therefore, it is necessary to determine whether the rotation of the rotating component 276 is caused by the control instruction transmitted from the controller 250 or a misoperation. Different dealing methods are taken for different situations. If the rotation of the rotating component 276 is caused by the control instruction transmitted from the controller 250, the rotation animation will be configured based on the component rotation information output from the controller 250. If the rotation of the rotating component 276 is caused by misoperation, the rotation animation is not configured.

Specifically, whether the rotation of the rotating component 276 is caused by the misoperation is determined by calculating a change rate of the component rotation angle in the embodiments of the disclosure. Specifically, the controller 250 is further configured to calculate the change rate of the component rotation angle.

For example, when the angle increment value collected by the controller 250 is 2 degrees at 0.2 s, the controller 250 calculates that the change rate of the component rotation angle is 2/0.2=10 degrees/s. When the angle increment value collected by the controller 250 is 0 degree at 0.4 s, the controller 250 calculates that the change rate of the component rotation angle is 0/0.2=0 degree/s.

In practice, the controller 250 may calculate the change rate of the component rotation angle over a certain period of time, thereby reducing computational efforts of the controller 250.

In an embodiment, the angle increment values collected by the controller 250 are 2 degrees at 0.2 s, 0 degree at 0.4 s, 0 degree at 0.6 s, 0 degree at 0.8 s and 0 degree at 1 s, respectively. In this case, the change rate of the component rotation angle calculated by the controller 250 is 0.2/1=0.2 degree/s, and a preset change rate in this embodiment is 5 degrees/s. Then it is determined that the change rate of the component rotation angle is less than the preset change rate in 1 s, and so the rotation of the rotating component 276 is caused by a misoperation.

For another example, in the embodiment illustrated in Table 1, the angle increment value collected by the controller 250 is 2 degrees at 0.2 s, and the change rate of the component rotation angle calculated by the controller 250 is 2/0.2=10 degrees/s. In practice, the controller 250 may calculate the change rate over a certain period of time, thereby reducing the computational efforts of the controller 250. For example, in the embodiment shown in Table 1, the angle increment values collected by the controller 250 are 2 degrees at 0.2 s, 2 degrees at 0.4 s, 2 degrees at 0.6 s, 2 degrees at 0.8 s, and 2 degrees at 1 s, respectively. In this situation, the change rate of the component rotation angle calculated by the controller 250 is (2+2+2+2+2)/1=10 degrees/s. In this embodiment, the preset change rate is 5 degrees/s. Then it can be determined that the change rate of the component rotation angle is greater than the preset change rate in 1 s, and so the rotation of the rotating component 276 is caused by the control instruction transmitted from the controller 250.

In the embodiments of the disclosure, the controller 250 may also determine when to stop configuring the rotation animation according to the change rate of the component rotation angle. Specifically, taking the embodiment shown in Table 1 as an example, the change rate of the component rotation angle at 0-9 s is 10 degrees/s, and the controller 250 continuously configures the rotation animation during this period. At 9.2 s, the change rate of the component rotation angle calculated by the controller 250 is 0, which is less than the preset change rate.

Then the controller 250 terminates the configuration of the rotation animation.

S205, the controller 250 configures the rotation animation based on the monitored component rotation information.

S206, the controller 250 outputs the rotation animation to the screen.

S207, the screen displays the rotation animation.

The controller 250 is further configured to configure the rotation animation based on the component rotation information output from the controller 250, and output the rotation animation to the screen 275; where the component rotation information is real-time rotation information of the rotating component 276.

In an embodiment, the component rotation information includes a component rotation direction (also called a first direction in this embodiment) and a component rotation angle.

The controller 250 is configured to convert the component rotation direction into an animation rotation direction, and the animation rotation direction (also called a second direction in this embodiment) is opposite to the component rotation direction.

The rotation animation is read according to a preset storage path of the rotation animation and the rotation animation is rotated according to the animation rotation information; and the animation rotation information includes the animation rotation direction and the component rotation angle.

In an embodiment, the controller 250 drives the screen 275 to start rotating, and transmits the monitored component rotation information to the controller 250 in real time. At 0.2 s, the component rotation information transmitted from the controller 250 is "rotate right 2 more degrees".

The controller 250 converts the component rotation direction (rotate right) into the animation rotation direction (rotate left).

The controller 250 configures a rotation animation interface to initialize OpenGL, configures OpenGL environment, loads animation resources, and sets animation parameters. Starting to configure animation content, each animation model is rotated left 2 degrees. In the following configuration process, the angle will change with the change of the component rotation information.

Figure 10A:
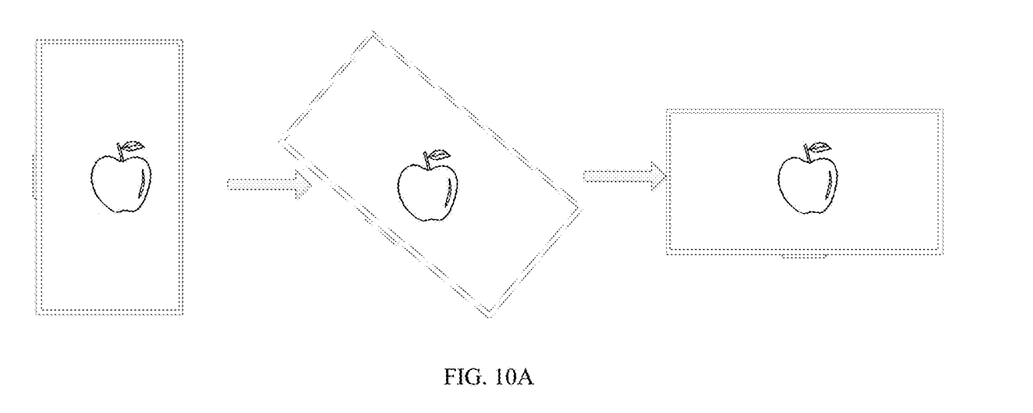
FIG. 10A illustrates a schematic diagram of a display interface during rotation according to an embodiment of the disclosure.
Figure 10B:
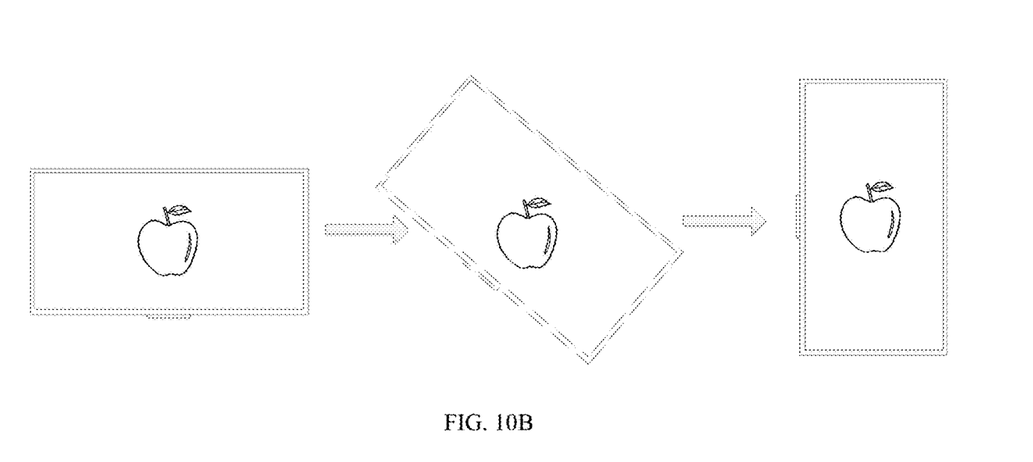
FIG. 10B illustrates a schematic diagram of a display interface during rotation according to an embodiment of the disclosure.

When the animation rotates, it always rotates around a center of the screen 275. For example, if a size of the screen 275 is W*H, the corresponding rotation animation rotates around a point of (W/2, H/2). The display interface during rotation can refer to FIG. 10A and FIG. 10B. FIG. 10A shows the change of the screen interface of the display device when changing from a portrait mode to a landscape mode according to an embodiment of the disclosure; and FIG. 10B shows the change of the screen interface of the display device when changing from a landscape mode to a portrait mode according to the embodiment of the disclosure.

The screen 275 exits the rotating animation interface when stopping rotating.

In another embodiment, the component rotation information includes a component rotation direction and a component rotation angle.

The controller 250 is further configured to convert the component rotation angle into an animation angle, and the animation angle is a negative number of the component rotation angle.

The rotation animation is read according to a preset storage path of a rotation animation and the rotation animation is rotated according to the animation rotation information; and the animation rotation information includes the component rotation direction and the animation angle.

In an embodiment, the controller 250 drives the screen 275 to start rotating, and transmits the monitored component rotation information to the controller 250 in real time. At 0.2 s, the component rotation information transmitted from the controller 250 is "rotate right 2 more degrees".

The controller 250 converts the component rotation angle (2 degrees) into the animation angle (minus 2 degrees), and the animation angle is a negative number of the component rotation angle.

The controller 250 configures the rotation animation interface to initialize OpenGL, configures OpenGL environment, loads animation resources, and sets animation parameters. To start to configure the animation content, each animation model is rotated right minus 2 degrees. In a subsequent configuration process, the angle will change with the change of the component rotation information.

When the animation rotates, it always rotates around a center of the screen 275. For example, if a size of the screen 275 is W*H, the corresponding rotation animation rotates around a point of (W/2, H/2).

The screen 275 exits the rotating animation interface when stopping rotating.

It is noted that the configuration process of rotation animation may be completed in the controller 250 or the animation processor 258 configured in the controller 250. In some embodiments, the configuration process of rotation animation may also be completed in the animation processor 258 of the display device independently.

In another exemplary embodiment of the disclosure, a display device is provided, including: a screen, a rotating component connected with the screen and configured to drive the screen to rotate, and a controller configured to receive a command for rotating the screen input from a user, present a non-centrosymmetric rotation animation on the screen, control the rotating component to drive the screen to rotate in a first direction, and control the rotation animation to rotate in a second direction; where the first direction is related to the second direction.

The first direction and the second direction may be opposite or cooperative. For example, when the first direction is clockwise, the second direction is counterclockwise; in this way, the rotation animation on the screen rotates counterclockwise when the screen rotates clockwise. As a result, the animation content remains relatively still in the opposite direction watching from the user's eyes.

In some exemplary embodiments, in order to keep the animation content relatively still in the direction of the user's eyes, absolute values of change rates of the two directions should also be consistent.

In another exemplary embodiment of the disclosure, a display device is provided and includes:

a screen; a rotating component connected with the screen and configured to drive the screen to rotate a target angle; and a controller configured to: present a centrosymmetric rotation animation on the screen in response to receiving a command for rotating the screen from a user, and control the rotating component to drive the screen to rotate.

The centrosymmetric rotation animation may be rotated in cooperation with the screen. There is no need to control the rotation of the rotation animation separately. In this case, since a center of the rotation animation image is symmetrical, the animation content may always be kept unchanged from the direction of the user's eyes, during the rotation of the screen.

Another exemplary embodiment of the disclosure provides a method for configuring a rotation animation, including:

controlling the rotating component to drive the screen to rotate, in response to receiving a command for rotating the screen; monitoring component rotation information of the rotating component; and configuring a rotation animation based on the component rotation information.

Another exemplary embodiment of the disclosure provides a method for configuring a rotation animation, including:

presenting a centrosymmetric rotation animation on a screen, in response to receiving a command for rotating the screen from a user; and controlling a rotating component to drive the screen to rotate.

In a specific implementation, the application further provides a computer storage medium, where the computer storage medium may store instructions which, when executed, may include part or all of the steps in various embodiments of a program push and playback method in the disclosure. The storage medium may be a diskette, an optical disk, a ROM or a RAM.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display device, comprising:
a screen;
a rotating component, connected with the screen and configured to drive the screen to rotate; and
a controller, configured to:
receive a command for rotating the screen from a user,
control the rotating component to drive the screen to rotate;
monitor component rotation information of the rotating component, the component rotation information comprising a component rotation angle;
calculate a change rate of the component rotation angle; and
in response to the change rate being greater than or equal to a preset change rate, configure a rotation animation based on the component rotation information.

2. The display device according to claim 1, wherein the controller is further configured to terminate configuration of the rotation animation, in response to the change rate being less than the preset change rate.

3. The display device according to claim 1, wherein the component rotation information comprises a component rotation direction and a component rotation angle.

4. The display device according to claim 3, wherein the controller is further configured to:
   convert the component rotation direction into an animation rotation direction, wherein the animation rotation direction is opposite to the component rotation direction; and
   rotate the rotation animation according to the component rotation angle in the animation rotation direction.

5. The display device according to claim 3, wherein the controller is further configured to:
   convert the component rotation angle into an animation rotation angle, wherein the animation rotation angle is a negative number of the component rotation angle; and
   rotate the rotation animation according to the animation rotation angle in the component rotation direction.

6. The display device according to claim 1, wherein the rotating component comprises a drive motor and a rotating shaft; and
   a first end of the rotating shaft is connected to the output of the drive motor and a second end of the rotating shaft is connected to the screen.

7. The display device according to claim 1, wherein the rotating component comprises a transmission element for adjusting a rotating speed and a moment output by the rotating component.

8. An image displaying method, comprising:
   receiving a command for rotating a screen of a display device from a user,
   controlling a rotating component of the display device to drive the screen to rotate;
   monitoring component rotation information of the rotating component, the component rotation information comprising a component rotation angle;
   calculating a change rate of the component rotation angle; and
   in response to the change rate being greater than or equal to a preset change rate, configuring a rotation animation based on the component rotation information.

9. The method according to claim 8, comprising:
   terminating configuration of the rotation animation, in response to the change rate being less than the preset change rate.

10. The method according to claim 8, wherein the component rotation information comprises a component rotation direction and a component rotation angle.

11. The method according to claim 10, comprising:
    converting the component rotation direction into an animation rotation direction, wherein the animation rotation direction is opposite to the component rotation direction; and
    rotating the rotation animation according to the component rotation angle in the animation rotation direction.

12. The method according to claim 10, comprising:
    converting the component rotation angle into an animation rotation angle, wherein the animation rotation angle is a negative number of the component rotation angle; and
    rotating the rotation animation according to the animation rotation angle in the component rotation direction.

13. The method according to claim 8, wherein the rotating component comprises a drive motor and a rotating shaft; and
    a first end of the rotating shaft is connected to the output of the drive motor and a second end of the rotating shaft is connected to the screen.

14. The method according to claim 8, wherein the rotating component comprises a transmission element for adjusting a rotating speed and a moment output by the rotating component.

* * * * *